US008308885B2

(12) United States Patent
Bradford

(10) Patent No.: US 8,308,885 B2
(45) Date of Patent: Nov. 13, 2012

(54) METHOD OF MAKING MULTI-LAYERED PRODUCT HAVING SPACED HONEYCOMB CORE SECTIONS

(75) Inventor: Judson A. Bradford, Holland, MI (US)

(73) Assignee: Bradford Company, Holland, MI (US)

( * ) Notice: Subject to any disclaimer, the term of this patent is extended or adjusted under 35 U.S.C. 154(b) by 157 days.

(21) Appl. No.: 12/908,184

(22) Filed: Oct. 20, 2010

(65) Prior Publication Data

US 2012/0100347 A1 Apr. 26, 2012

(51) Int. Cl.
*B32B 38/18* (2006.01)
*B31F 1/22* (2006.01)

(52) U.S. Cl. .......................... 156/204; 156/210; 264/287

(58) Field of Classification Search .................. 156/204, 156/205, 210; 264/286, 287
See application file for complete search history.

(56) References Cited

U.S. PATENT DOCUMENTS

| | | | |
|---|---|---|---|
| 1,886,830 | A | 11/1932 | Murray, Jr. |
| 2,716,805 | A | 9/1955 | Reed |
| 3,582,447 | A | 6/1971 | Stolki |
| 3,904,551 | A | 9/1975 | Lundsager et al. |
| 3,932,090 | A | 1/1976 | Brumlik |
| 4,197,341 | A | 4/1980 | Rule |
| 4,847,966 | A | 7/1989 | Kuchelmeister |
| 5,106,668 | A | 4/1992 | Turner et al. |
| 5,132,156 | A | 7/1992 | Trassare, Jr. et al. |
| 5,389,059 | A | 2/1995 | Corwin |
| 6,183,836 | B1 | 2/2001 | Pflug |
| 6,720,060 | B1 | 4/2004 | Swars |
| 6,726,974 | B1 | 4/2004 | Pflug et al. |
| 6,800,351 | B1 | 10/2004 | Pflug et al. |
| 7,032,328 | B2 | 4/2006 | Wilson et al. |
| 2005/0170957 | A1 | 8/2005 | Maus et al. |
| 2005/0263244 | A1 | 12/2005 | Henderson et al. |
| 2008/0075916 | A1 | 3/2008 | Bradford |
| 2008/0131654 | A1 | 6/2008 | Bradford et al. |
| 2008/0176027 | A1 | 7/2008 | Pflug et al. |
| 2010/0055387 | A1 | 3/2010 | Bradford |

FOREIGN PATENT DOCUMENTS

| | | |
|---|---|---|
| DE | 19716637 | 10/1998 |
| FR | 1509018 | 1/1968 |
| WO | WO9703816 | 2/1997 |
| WO | WO0032382 | 6/2000 |
| WO | WO0168351 | 9/2001 |
| WO | WO2006053407 | 5/2006 |

OTHER PUBLICATIONS

Project Page, “Composite Materials Group”, K.U. Leuven Dept. MTM, Maschinenfabrik Meyer (no date), 1 page.
Pflug, Jochen, et al., “Continuously Produced Honeycomb Cores”, K.U. Leuven Dept. MTM (no date), 10 pages.

(Continued)

*Primary Examiner* — Katarzyna Wyrozebski Lee
*Assistant Examiner* — Scott W Dodds
(74) *Attorney, Agent, or Firm* — Wood, Herron & Evans, LLP

(57) ABSTRACT

A process of making a multi-layered product having an interior layer including spaced honeycomb core sections. The interior layer is treated or plastically deformed in selected areas and then folded to create spaced honeycomb sections at desired locations and of desired sizes. A generally flat web of material used to make the interior layer extends between the honeycomb sections. Outer protective skins are applied to exterior surfaces of the interior layer to create a multi-layered material which is then cut to size.

25 Claims, 13 Drawing Sheets

OTHER PUBLICATIONS

"Composite Materials Group", "TorHex Projects", http://www.mtm.kuleuven.ac.be/Research/C2/poly/TorHex.htm, (2004), 6 pages.

Pflug, Jochen, et al., "Thermoplastic Folded Honeycomb Cores—Cost Efficient Production of All Thermoplastic Sandwich Panels", K.U. Leuven, Dept. Mechanical Engineering, (no date), 8 pages.

Eureka EU 1440 Factory, "E! 2796 Factory Thermhex—New Thermoplastic Honeycomb Sandwich Core Material for Structural Applications", http://www.kp.dlr.de/EUREKA/FACTORY/publications.htm, (Sep. 9, 2005), 6 pages.

Pflug, Jochen et al, "Folded Honeycomb Cardboard and Core Material for Structural Applications", Sandwich Construction 5, EMAS 1999, 12 pages.

Pflug, Jochen et al., "New Sandwich Material Concepts—Continuously Produced Honeycomb Cores", Composites in Transport Network, K.U. Leuven, Dept. MTM, CMG, Oct. 2, 2003, 32 pages.

METHOD OF MAKING MULTI-LAYERED PRODUCT HAVING SPACED HONEYCOMB CORE SECTIONS

FIELD OF THE INVENTION

This invention relates generally to a product for structural, packaging, and other applications and the process of making the product.

BACKGROUND OF THE INVENTION

In the aerospace industry, honeycomb products have been used as a core component for sandwich panels and boards that are resistant to buckling and bending. These honeycomb products each comprise a plurality of cells, which in cross-section have a generally hexagonal shape. Such products may be fabricated from aluminum, fiber paper or plastic, among other materials. A sandwich structure may be prepared having two cover layers or skins which are welded, adhesively bonded or otherwise secured to the honeycomb product to create a multi-layered or multi-laminate material. Interest expressed in other industrial sectors concerning the use of lightweight sandwich structures is continually growing, due at least in part to the realization of its high strength properties while maintaining a relatively low structural weight per volume of product.

A multi-layered or multi-laminate material having a honeycomb product as the core thereof may be used in the packaging industry. However, in automobile part packaging and comparable markets, such a product must compete with corrugated paperboard or corrugated plastic or like materials which may be produced quickly and relatively inexpensively.

U.S. Pat. No. 6,183,836 discloses a honeycomb core for use in a sandwich material in which the material of the honeycomb core is cut and then folded to create a plurality of hexagonal cells. Due to the cuts in the sheet prior to folding the sheet, the resultant cells may be weaker than desired.

A process for producing a folded honeycomb core for use in sandwich materials from a continuous uncut web is disclosed in U.S. Pat. No. 6,726,974. U.S. Pat. No. 6,800,351 discloses another process for producing a folded honeycomb core which includes scoring a corrugated material before rotating interconnected corrugated strips. The honeycomb core resulting from using either of these methods may have material which adds to the weight of the honeycomb core, but may not significantly improve the strength of the honeycomb core.

Accordingly, there is a need for a multi-layered product which has an interior layer having honeycomb core sections and a favorable strength-to-weight ratio.

There is further a need for a process for manufacturing a multi-layered product having an interior layer having honeycomb core sections.

SUMMARY OF THE INVENTION

The present invention comprises a process for producing a sandwich-like or multi-layered product having an interior layer, including honeycomb core sections or portions. The product may have any number of layers; the product is not intended to be limited to three layers. The processes of the present invention may be used to make products for use in any desired environment or industry, including but not limited to, packaging materials.

According to one aspect of this invention, a process of making a multi-layered product comprises moving a generally planar web of material in a first direction. The generally planar or generally flat web of material may be unrolled from a roll of material before being treated. The web or webs may be heated to any desired temperature and be any desired thickness at the start of the process and at any stage in the process. In addition, the web or webs may be any desired material including, but not limited to, plastic.

The next step comprises treating a section of the generally planar web of material to create a generally corrugated profile with flattened peaks and flattened valleys joined by connecting portions of the web, the flattened peaks and flattened valleys extending in the first direction. The flattened peaks are co-planar in a plane above the generally planar web of material and the flattened valleys are co-planar with the generally planar web of material, in one embodiment. The treating step comprises using at least one movable tool which may or may not be heated.

Another step comprises folding the treated section of the web to create a honeycomb core section. Another step comprises temporarily stopping or pausing the treatment (the use of the tool) while allowing the generally planar web of material to continue its movement in the first direction.

Another step comprises applying or securing outer skins to multiple spaced honeycomb core sections. In order to obtain a product of a desired size, the last step in the process may comprise cutting the generally planar web of material and the outer skins to create the finished product.

According to another aspect of the invention, the process comprises making a multi-layered product, including an interior layer having honeycomb core sections, applying outer skins to the interior layer and cutting the combined layers to a desired size. The process of making the interior layer comprises continuously moving a generally flat web of material. The generally flat web may be unrolled from a roll and moved by any conventional means, such as a conveyor, for example. The process of making the honeycomb core further comprises plastically deforming a first portion of the generally flat web of material to create a generally corrugated profile with flattened peaks and flattened valleys joined by connecting portions of the web. A movable tool may be used to plastically deform the generally flat web of material. The tool may be heated. The flattened peaks and flattened valleys extend in the direction of travel of the web.

Another step in making the interior layer comprises folding the first plastically deformed portion of the web of material to create a first honeycomb core section. Another step in making the honeycomb core comprises continuing to move the generally flat web of material while the tool is not being used or paused. Another step in making the interior layer comprises plastically deforming a second portion of the generally flat web of material to create a generally corrugated profile with flattened peaks and flattened valleys joined by connecting portions of the web. The flattened peaks and flattened valleys extend in the direction of travel of the web. Another step in making the interior layer comprises folding the second plastically deformed portion of the web of material to create a second honeycomb core section spaced from the first honeycomb core section.

In another aspect of the invention, a process of making a honeycomb product comprises making an interior layer having spaced honeycomb core sections by moving a generally flat web of material in a first direction. Another step comprises plastically deforming portions of the generally flat web using a tool to create a generally corrugated profile with flattened peaks and flattened valleys joined by connecting portions of the web, the flattened peaks and flattened valleys extending in the direction of travel of the web. Another step comprises folding the plastically deformed portions of the web of material to create multiple, spaced honeycomb core sections joined by the generally flat web. Another step comprises applying outer skins to the interior layer having the spaced honeycomb core sections.

Regardless of the method used to create the multi-layered product, one advantage is that a lightweight, strong product having a large strength-to-weight ratio may be quickly and easily manufactured in a desired size or height. The product of this invention, which may be produced according to any of the processes described herein, has a relatively high strength-to-weight ratio, and may be made from many different materials quickly and inexpensively. The strength-to-weight ratio may be improved by strategic removal of material from the web at some time in the process of fabricating the product. The multi-layered product may be incorporated into any desired product, or used in any desired manner.

BRIEF DESCRIPTION OF THE DRAWINGS

The objectives and features of the present invention will become more readily apparent when the following detailed description of the drawings is taken in conjunction with the accompanying drawings in which.

DETAILED DESCRIPTION OF THE DRAWINGS

Figure 1:
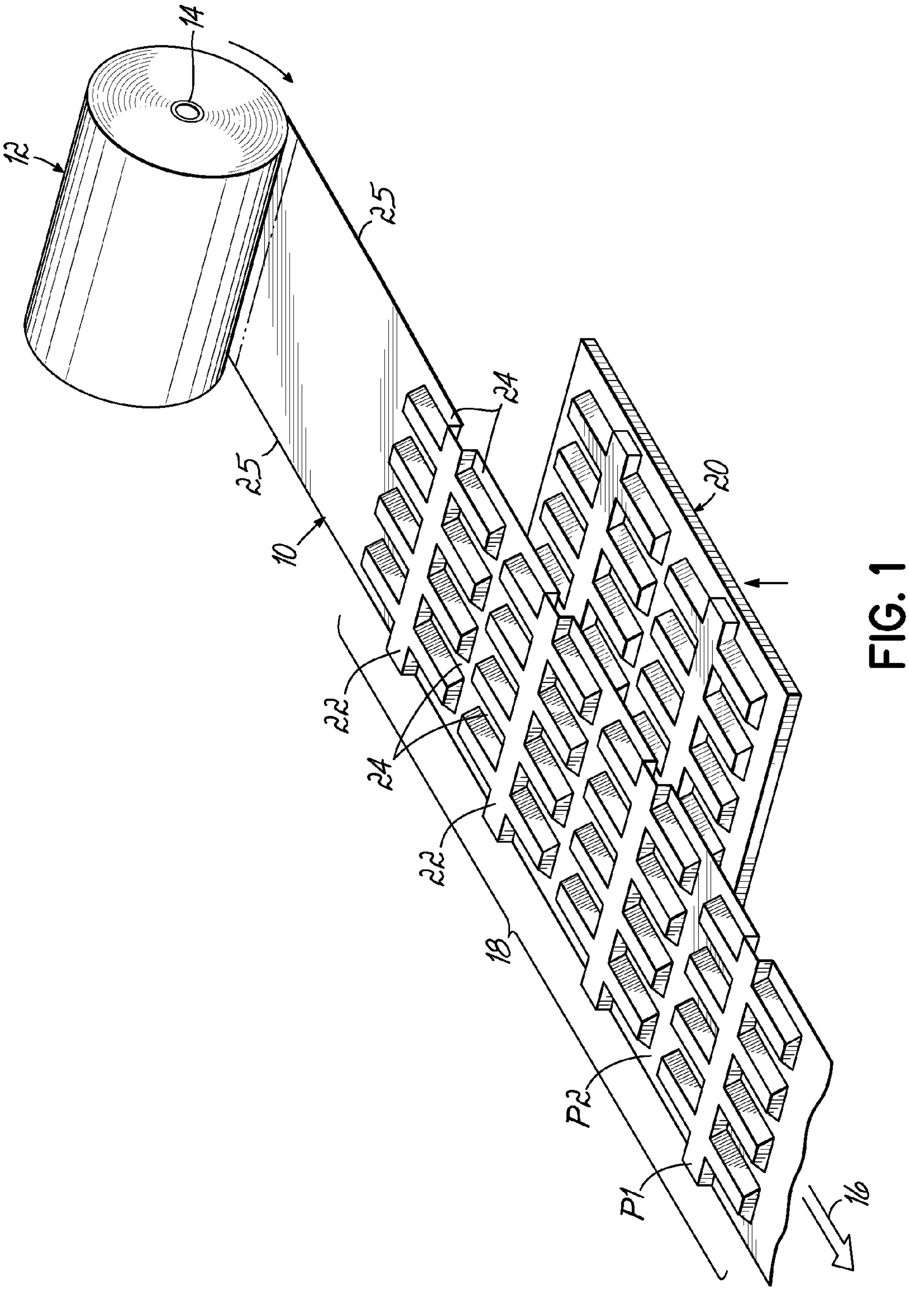
FIG. 1 is a perspective view of a generally planar web of material being unrolled and treated by a movable thermo-forming tool.

Referring to the drawings, and particularly to FIG. 1, a flexible web of material 10 is wound into a roll 12 around a core 14. Once unwound or unrolled, the web of material 10 is generally planar or flat. It is then pulled or moved in the direction of arrow 16 in any conventional manner. Although not shown, the web 10 may pass around or between several rollers before being treated or deformed as described below.

The flexible web of material 10 may be solid or may have openings formed therethrough at any stage in the process, as illustrated and/or described in U.S. patent application Ser. No. 11/535,623, which is fully incorporated herein.

The next step in the process shown in FIGS. 1-5 is to plastically deform or treat a first portion or section 18 of the unrolled web of material 10 for a predetermined time period. This may be accomplished by using a movable tool 20 which may be heated to any desired temperature. Alternatively, the unrolled web of material 10 may be heated before being plastically deformed via the tool 20. This treatment or deformation creates a generally corrugated profile with flattened peaks 22 and flattened valleys 24 extending in the direction of travel of the web 10 shown by arrow 16. The tool 20 plastically deforms the unrolled web of material 10 in a manner described in U.S. Pat. No. 6,726,974, which is fully incorporated herein. More particularly, the flattened peaks are coplanar in a plane P1 raised above the plane P2 of the unrolled web 10. The flattened valleys 24 remain in the plane P2 of the unrolled web 10.

Although the tool 20 is shown as imparting one imprint upon the web 10, other configurations or types of corrugations may be imparted upon the web 10, as described in U.S. patent application Ser. No. 11/535,623.

Figure 2:
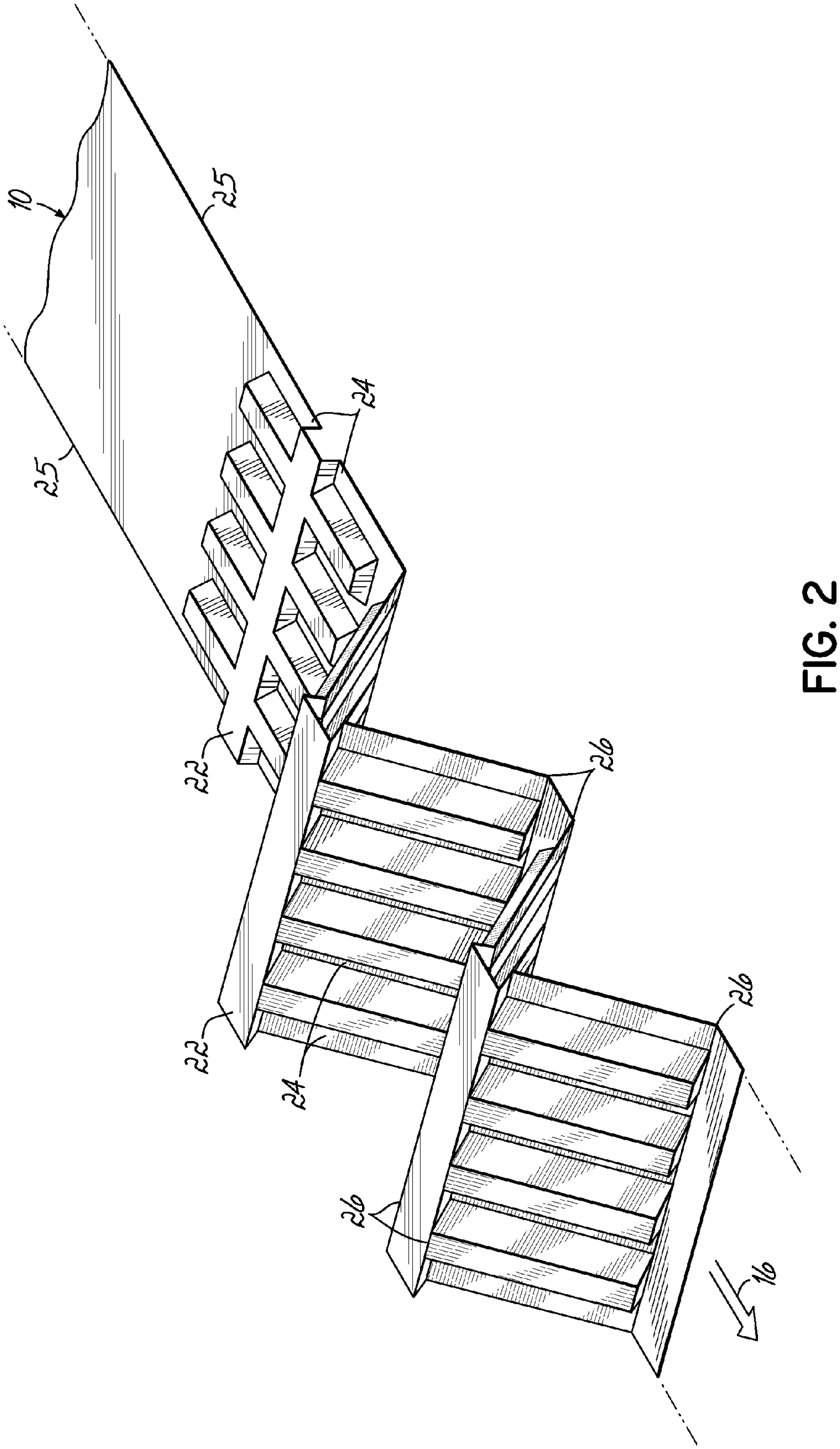
FIG. 2 is a perspective view of the thermoformed portion of the web of FIG. 1 being folded.
Figure 3A:
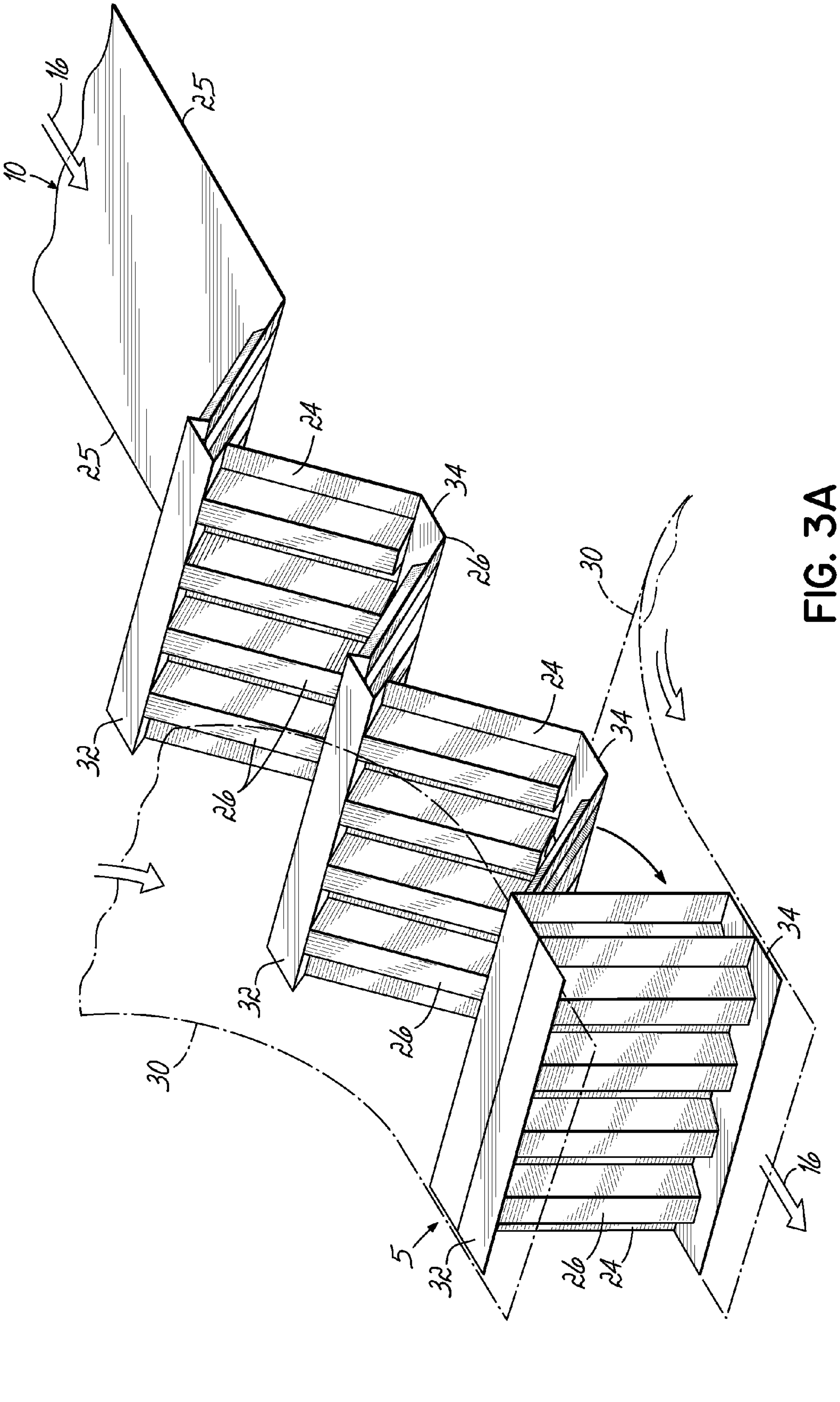
FIG. 3A is a perspective view of two outer skins being applied to the folded web of FIG. 2.
Figure 3B:
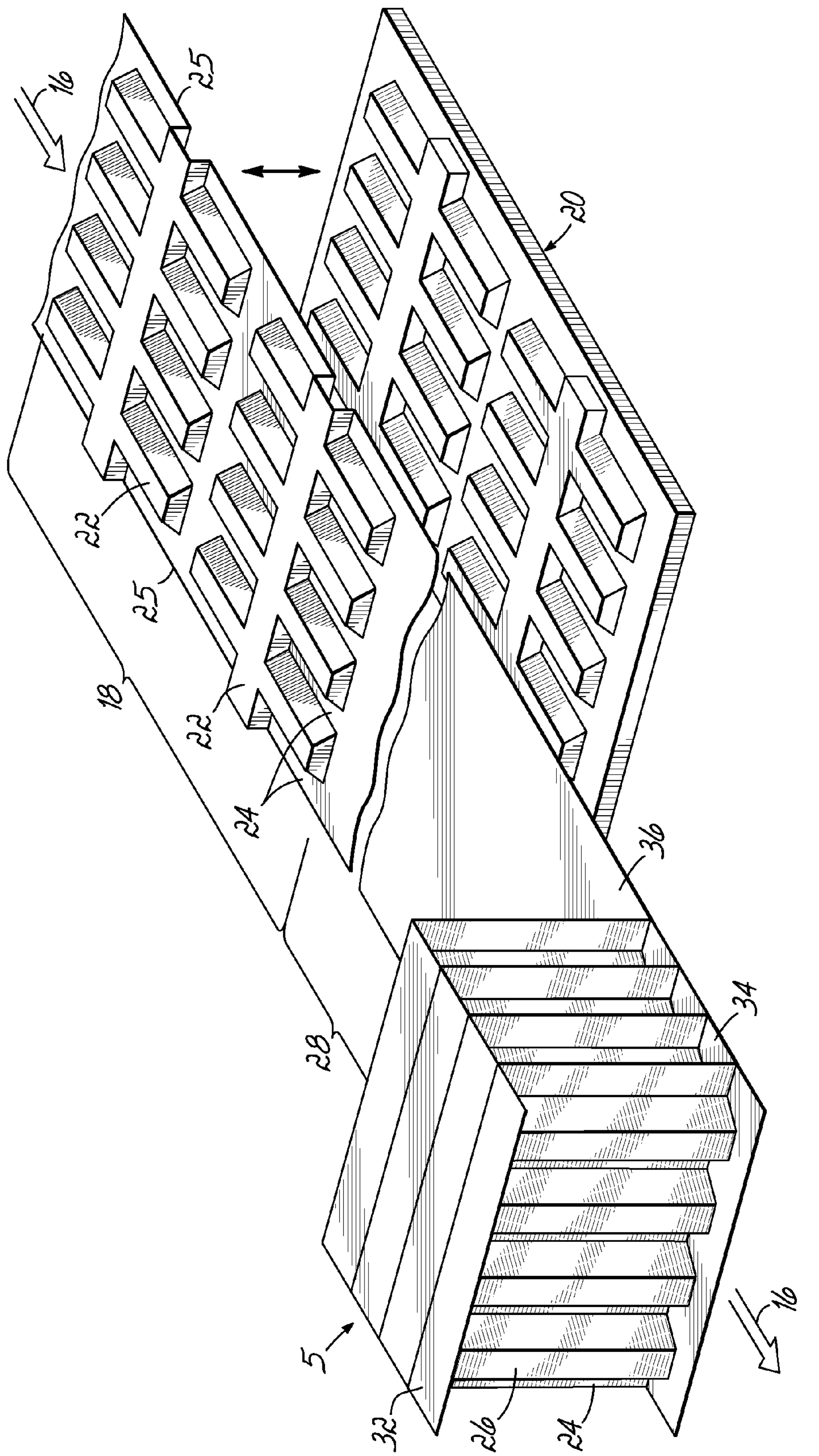
FIG. 3B is a perspective view of the web of FIG. 3A being further treated.
Figure 4:
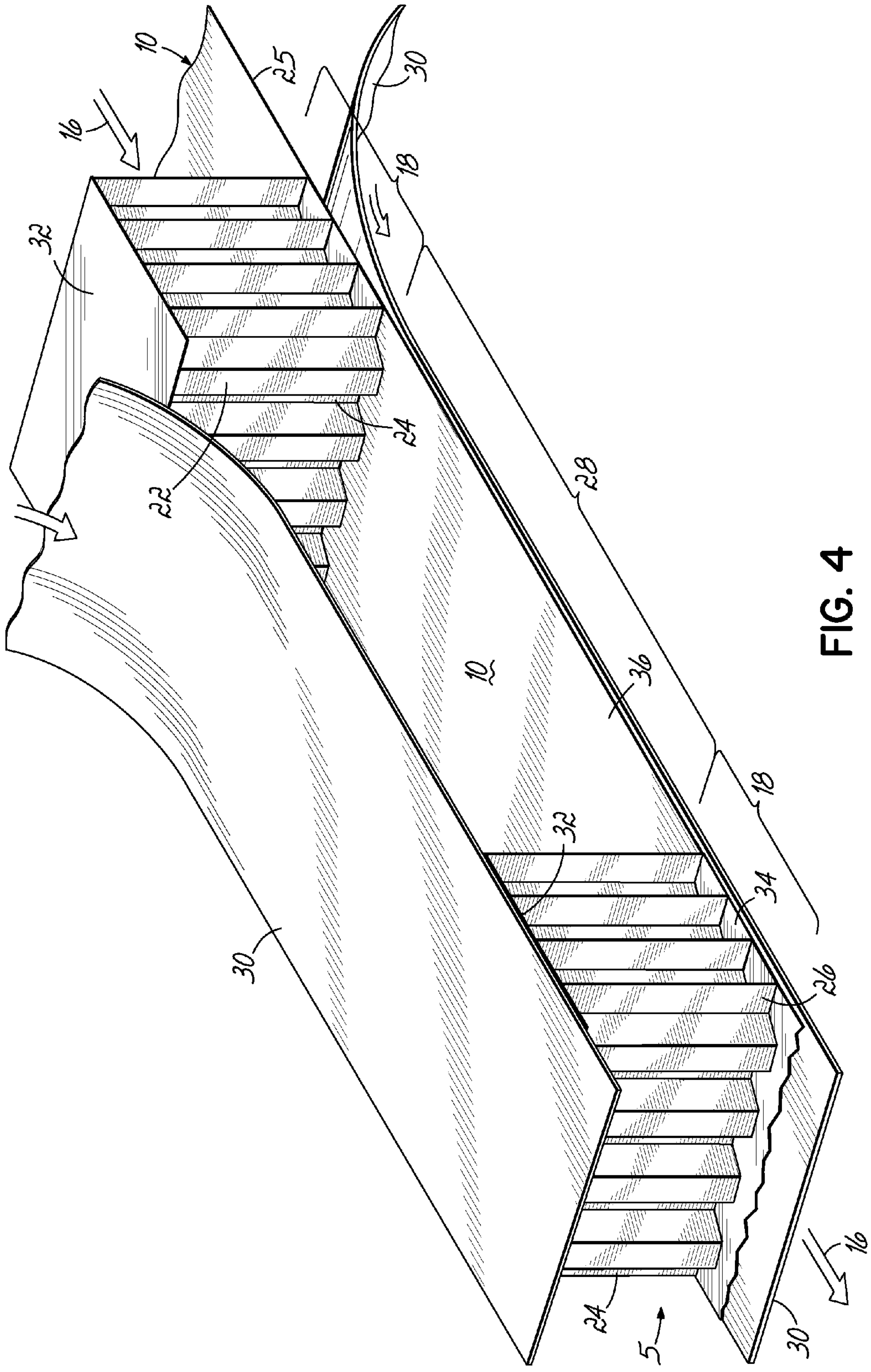
FIG. 4 is a perspective view of a portion of a treated web according to one aspect of the present invention.

As shown in FIG. 2, the next step in the process is to fold the plastically deformed first portion 18 of the unrolled web 10 along fold lines 26 in a manner taught by U.S. Pat. No. 6,726,974 and/or U.S. patent application Ser. No. 11/535,623. These fold lines 26 extend transversely from one side edge 25 of the web 10 to the opposing side edge 25 in a direction generally perpendicular to the direction of travel of the web 10. As shown in FIGS. 3A and 3B, after being folded, the treated first portion 18 of the web 10 shortens and becomes a first honeycomb core section 5.

As shown in FIGS. 3A-5, the next step in the process is to stop the treatment of the moving web of material 10, i.e., temporarily stop or pause the tool 20 while the web 10 continues moving in the first direction (direction of arrow 16 or downstream). When the tool 20 is "turned off" or not being used (inactive), the web of material 10 continues to move, creating a gap 28 between honeycomb core sections 5. See FIG. 4. In the gap 28, the web 10 is untreated (is not plastically deformed) and remains relatively flat or planar.

As shown in FIG. 3B, when desired, the tool 20 can be "turned on" or operated again to create a second physically deformed portion or section 18 of the unrolled web of material 10 spaced downstream from the upstream honeycomb core section 5 and downstream of a gap 28. After being folded, the second honeycomb core portion or section 18 of the web of material 10 is located downstream of the first treated section or portion 18 created earlier in time and upstream. See FIGS. 4 and 5. This process of starting and stopping the operation of the tool and hence, the physical deformation of the continuously moving web of material creates a plurality of spaced honeycomb core sections 5 which are firmer than the other sections or gaps 28 therebetween having no honeycomb core. The timing of the operation of the steps necessary to create the spaced honeycomb core sections 18 may be varied as desired and is not intended to be limited. Similarly, the sizes of the spaced gaps 28 and spaced honeycomb core sections 18 shown in the drawings are not intended to be limiting, but rather are merely illustrative.

Figure 5:
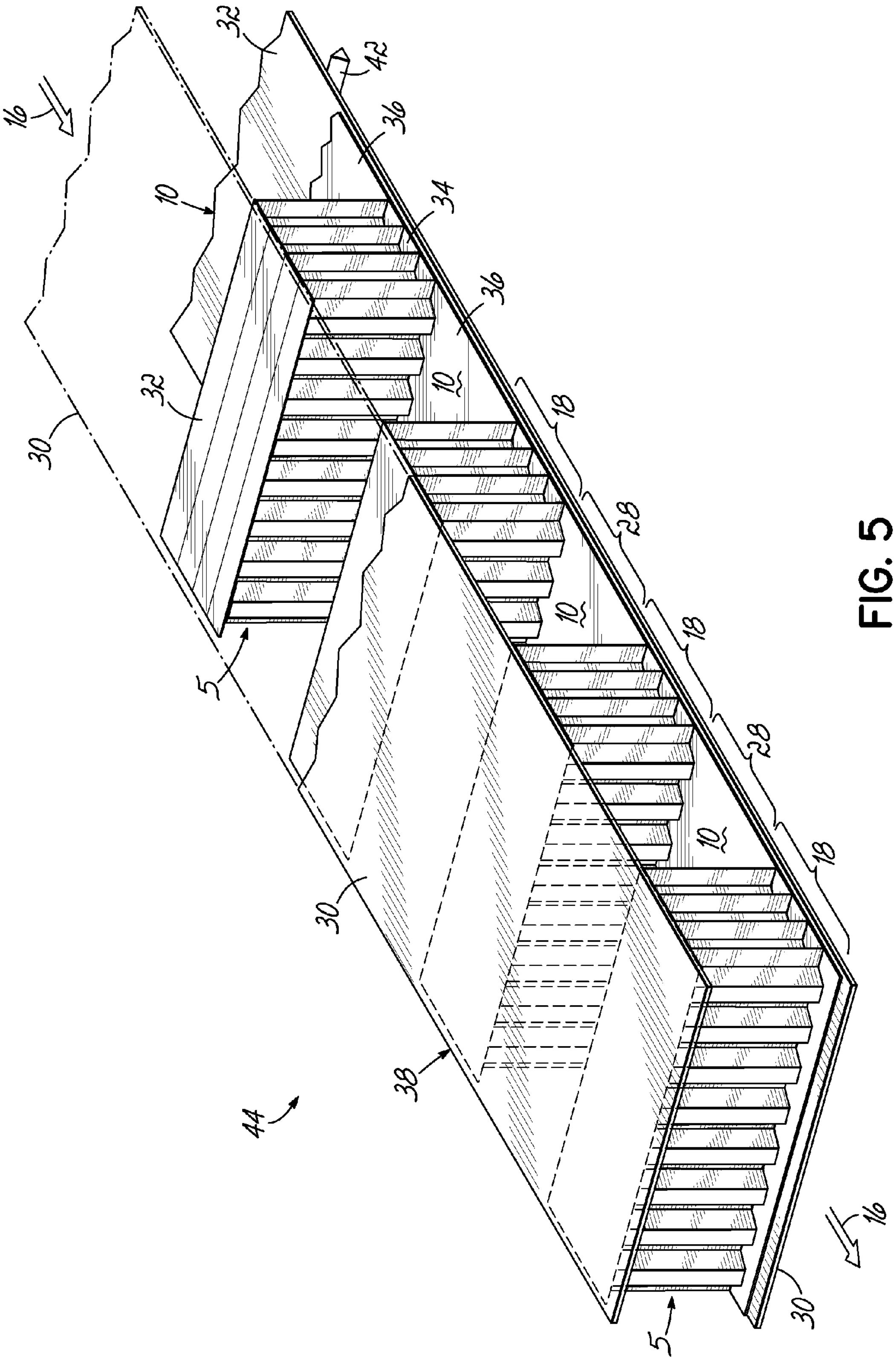
FIG. 5 is a perspective view of the portion of the web of FIG. 4.

Another step in the process is applying or securing outer skins 30 to upper and lower surfaces 32, 34 of the spaced honeycomb core sections 5 in the direction of travel of the web 10. In addition, the lower outer skin 30 may be applied or secured to the lower surface 36 of the web of material 10 between the spaced honeycomb core sections 5 (in the gaps 28). The upper surface of the web 10 is indicated by the numeral 37. As shown in FIG. 5, this process described above with the steps being performed in any desired order creates a continuous strip of material 38 having a sandwich-like or trilaminate composition, the outer skins 30 being outside and secured to the continuous interior layer 40. The continuous interior layer comprises spaced honeycomb core sections 5 between which are gaps 28.

Figure 5A:
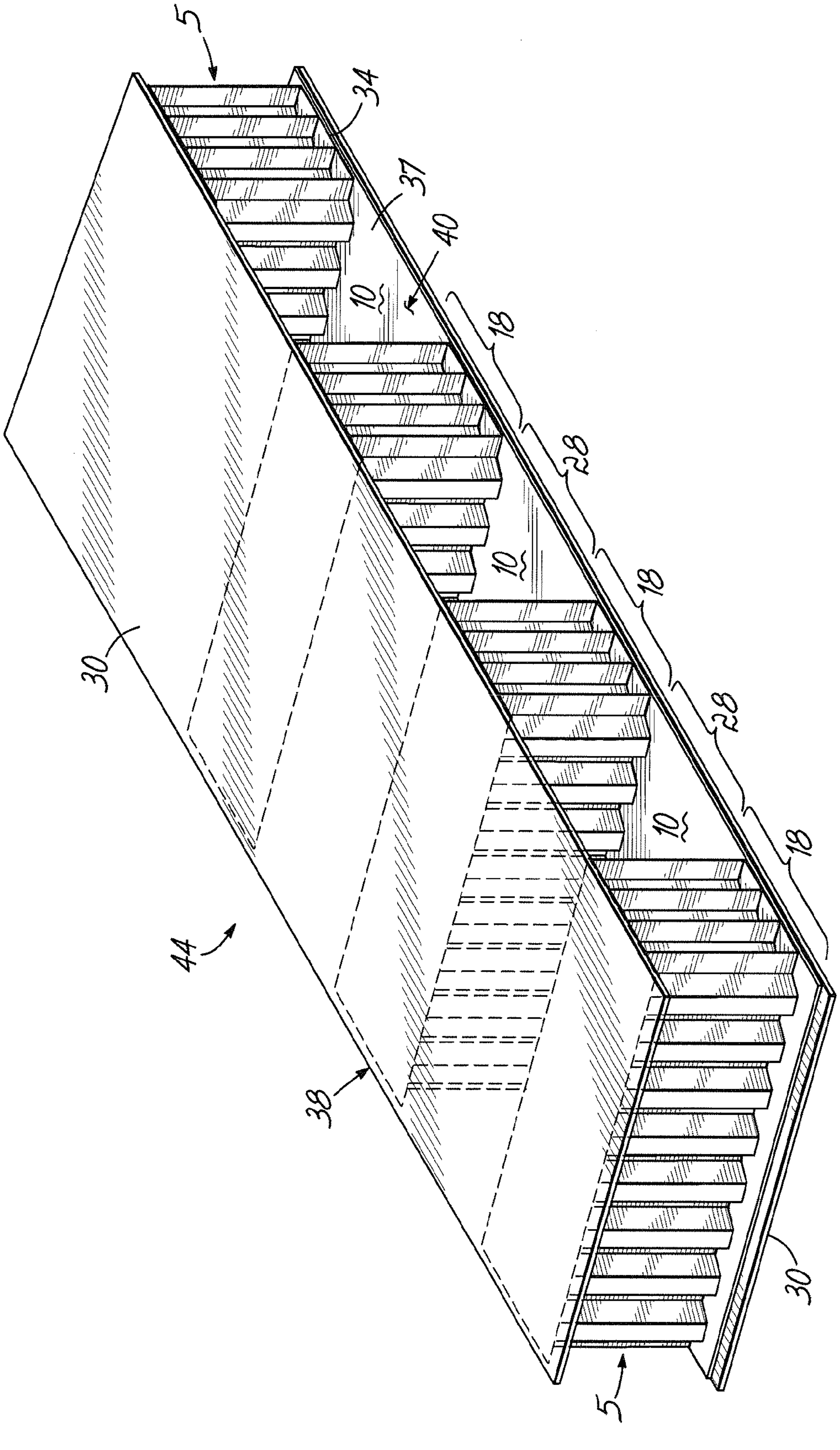
FIG. 5A is a perspective view of a finished product made by the method shown in FIGS. 1-5.

As illustrated in FIGS. 5 and 5A, the strip 38 may be cut to size via a cutter 42 to create a finished product 44 having a honeycomb interior layer. Although one size product 44 is illustrated in FIG. 5A, the product 44 may be any desired size, i.e., length, width and/or height.

Figure 6:
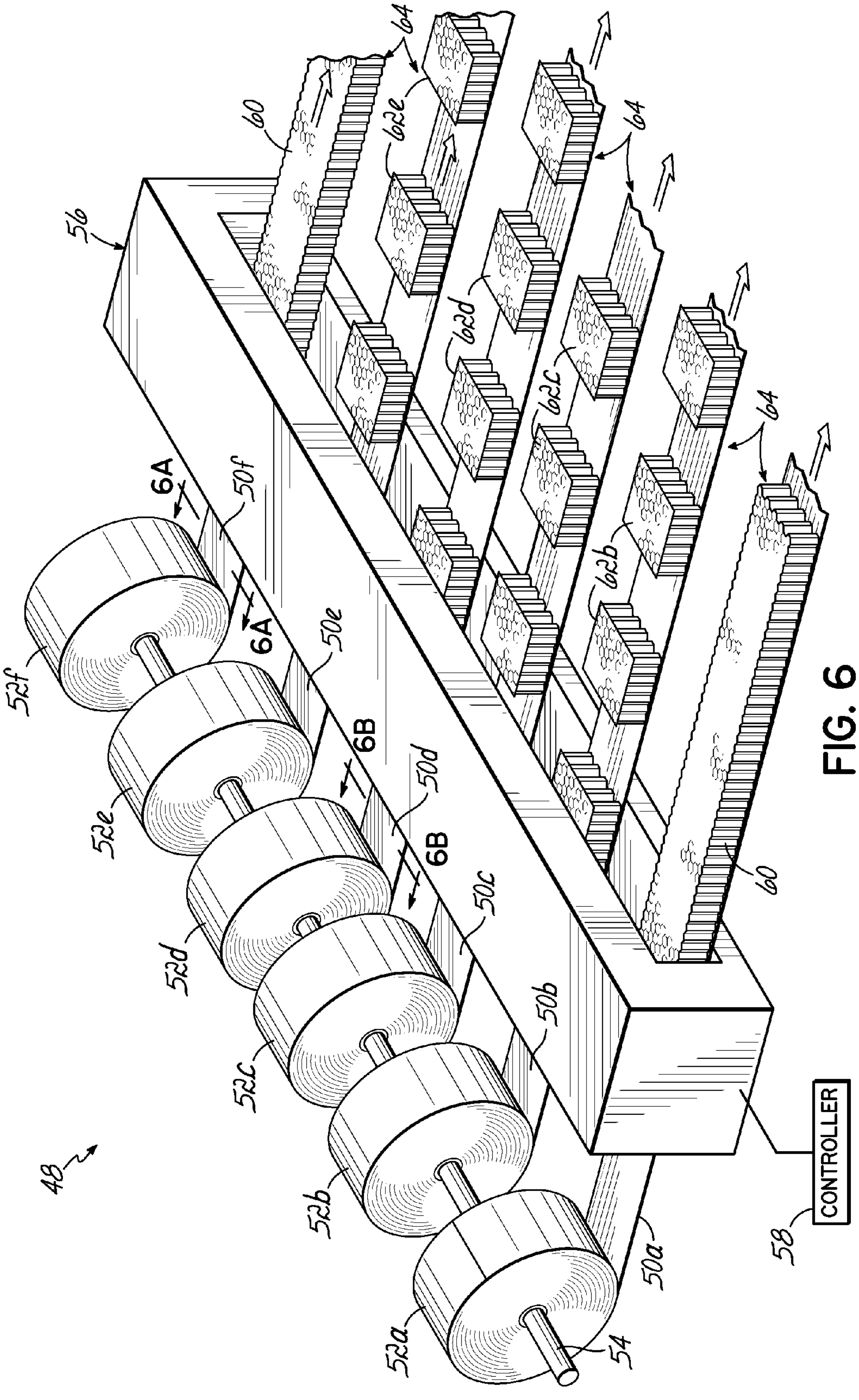
FIG. 6 is a perspective view of an apparatus for making a multi-layered product using the method of FIGS. 1-5.
Figure 7:
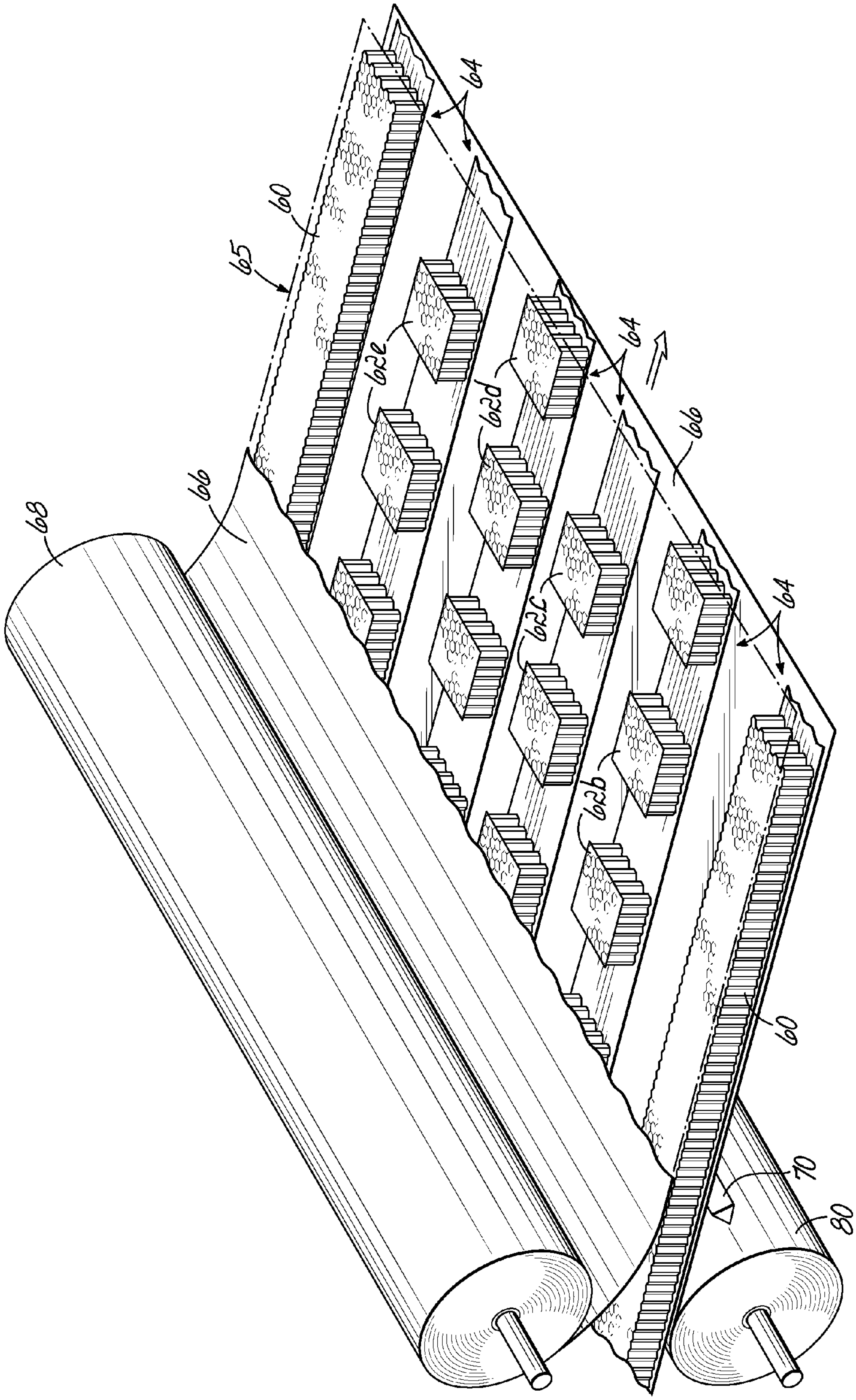
FIG. 7 is a perspective view of opposed outer skins being applied to spaced strips produced by the apparatus of FIG. 6.
Figure 8:
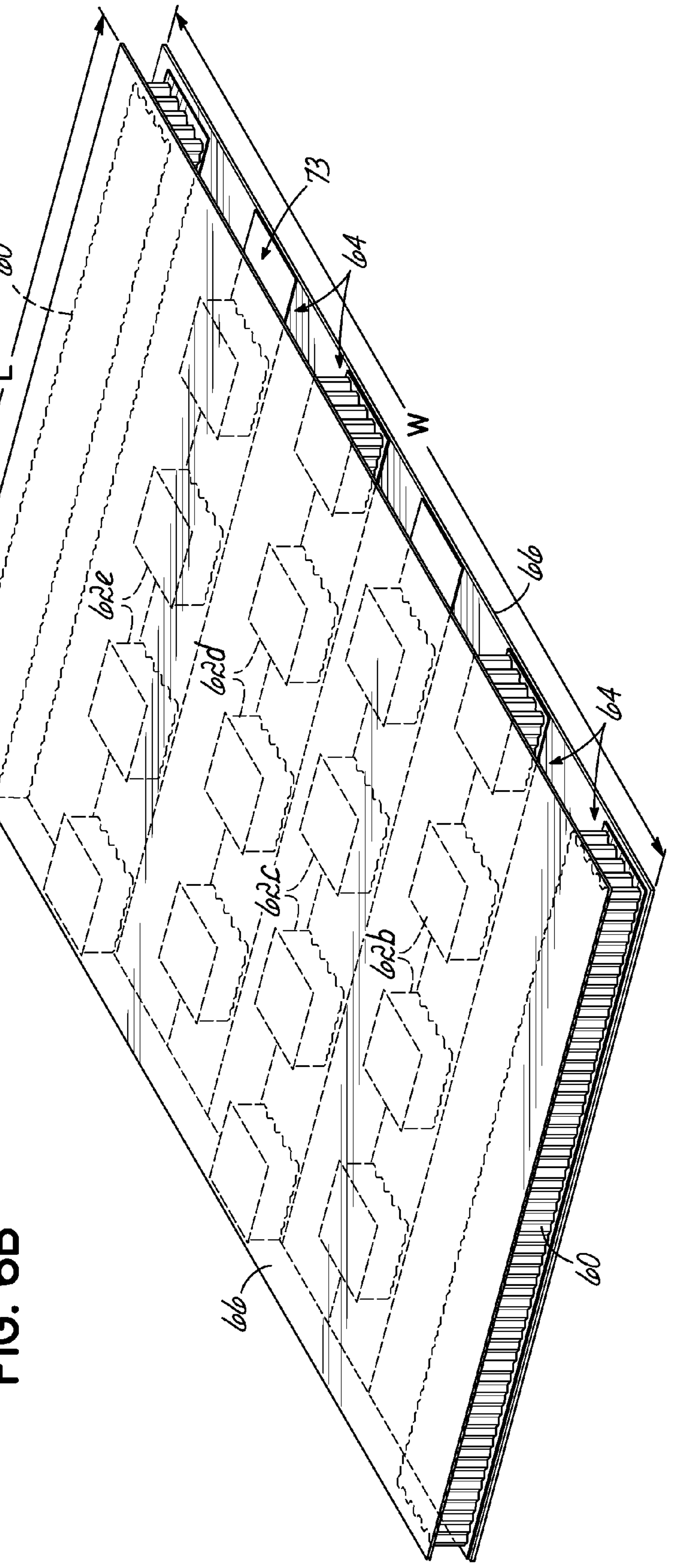
FIG. 8 is a perspective view of a finished product made by the method shown in FIGS. 6 and 7.

FIGS. 6-8 illustrate another method of making another honeycomb product 46. FIG. 6 illustrates an apparatus 48 comprising a plurality of webs of material 50*a-f* wound on spaced rolls 52*a-f*. The rolls 52*a-f* are supported by a support 54 in the form of a rod. Although six rolls of material are illustrated, any desired number of rolls and/or webs of material may be used in this process of making a honeycomb product. Similarly, the rolls may be supported by any support(s) and may be located at different locations than those illustrated in FIGS. 6-8. After the webs 50*a-f* are unwound, they are passed through a treatment processor 56. Inside the processor 56, each web is treated in a manner as shown in FIGS. 1-5. A controller 58 controls the timing of the treatment or deformation of each web inside the processor 56 as well as the speed of travel of the webs.

Figure 6A:
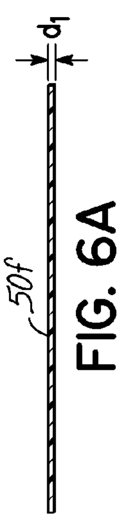
FIG. 6A is a cross-sectional view along the line 6A-6A of FIG. 6.
Figure 6B:
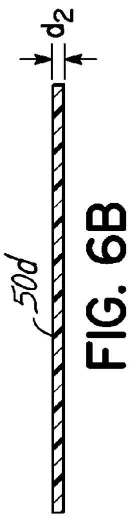
FIG. 6B is a cross-sectional view along the line 6B-6B of FIG. 6.

As shown in FIGS. 6A and 6B, the thickness or height of the unrolled webs may be different. FIG. 6A shows a web 50*f* of a thickness $d_1$ which is less than the thickness $d_2$ of web 50*d* shown in FIG. 6B. The location of the webs shown in cross-section is merely illustrative and not intended to be limiting. For example, the webs not shown in cross-section, webs 50*a*-50*c* and 50*e*, may be the thickness of web 50*f* or web 50*d* or any other desired thickness. In other words, any number of webs may be any desired thickness. Alternatively, the webs may all be the same thickness.

As shown in FIG. 6, the outermost webs 50*a* and 50*f* are continuously treated by the processor 56 to create continuous honeycomb core borders 60. The interior webs 50*b-e* are intermittently treated by processor 56 to create spaced honeycomb core blocks 62*b-e*. The honeycomb core blocks 62*b* are joined together by the web 50*b* as described above and shown in FIGS. 1-5. The honeycomb core blocks 62*c* are joined together by the web 50*c*. The honeycomb core blocks 62*d* are joined together by the web 50*d*. The honeycomb core blocks 62*e* are joined together by the web 50*e*.

After passing through the processor 56, all of the treated spaced strips 64 move in the direction of the arrows shown in FIGS. 6-9. FIG. 7 shows two outer or protective skins 66 being placed over and under the spaced strips 64 to create a three-layered continuous product 65. The outer skins 66 are shown applied from rolls of material 68, but may be supplied in any known manner. A cutter or cutting device 70 cuts the three-layered continuous product 65 to a desired size having a longitudinal dimension or length L in the direction of travel of the materials and a transverse dimension or width W perpendicular to the direction of travel of the materials, as shown in FIGS. 7 and 8. The result is a finished product 72 having an interior layer 73, including honeycomb core sections with firm edges or sides and a checkerboard interior. Alternatively, the three-layered continuous product 65 may be rolled up and later cut to obtain products 72 of desired sizes. This process enables the product 46 to weigh less than comparable products having a solid honeycomb core without compromising strength or integrity.

Figure 9:
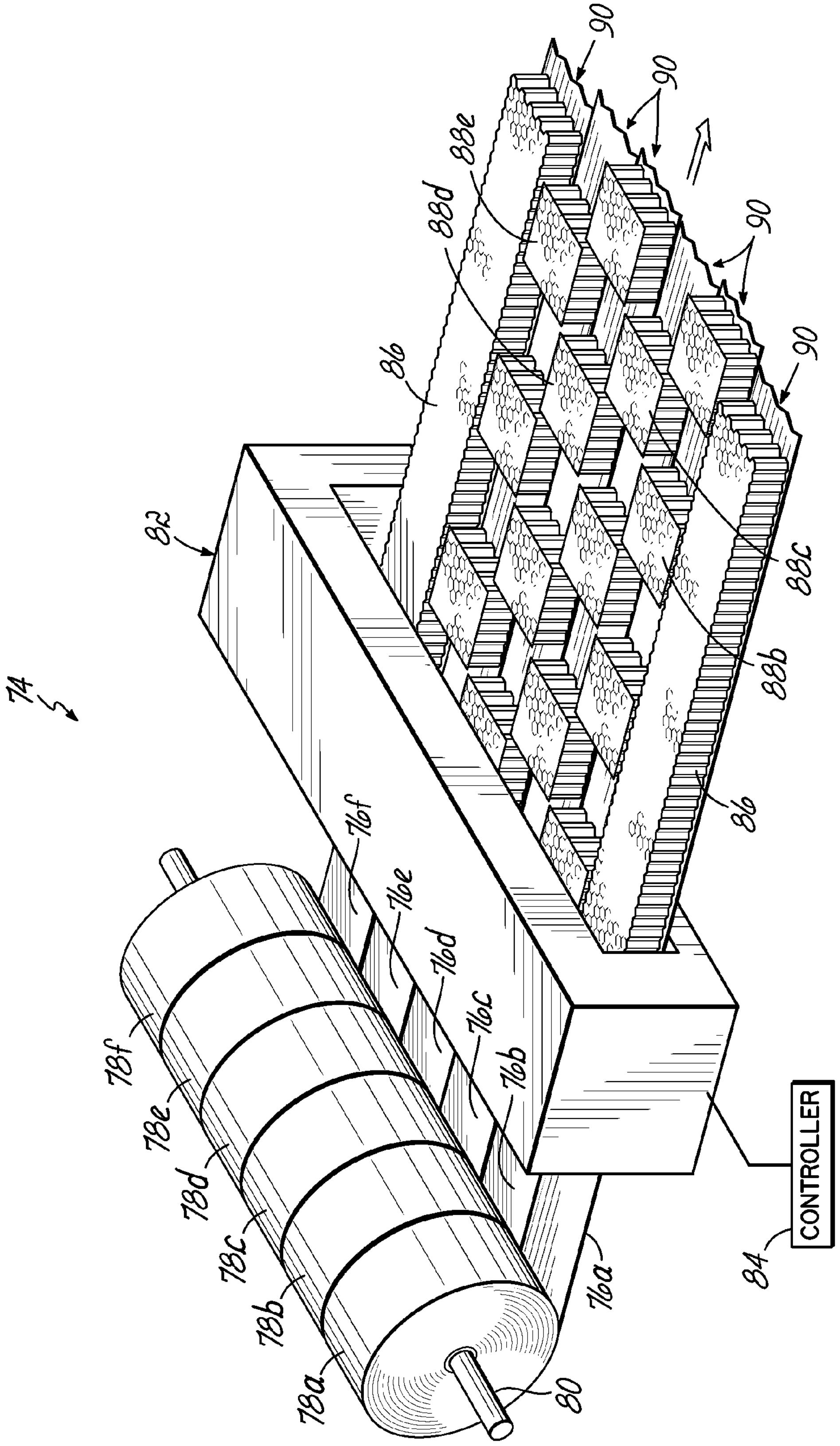
FIG. 9 is a perspective view of an apparatus used to create a portion of an alternative product.
Figure 10:
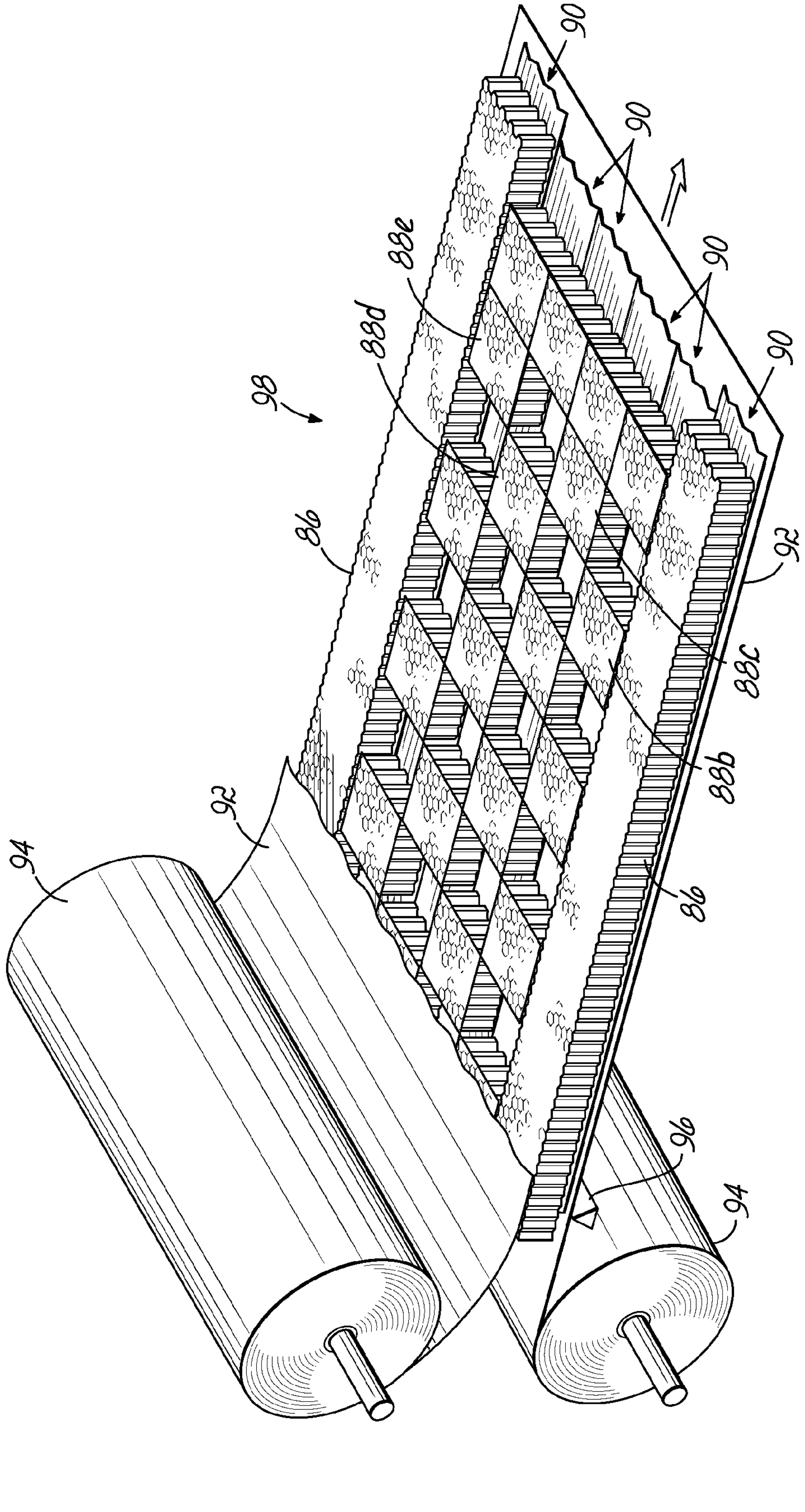
FIG. 10 is a perspective view of opposed outer skins being applied to strips created by the apparatus of FIG. 9.
Figure 11:
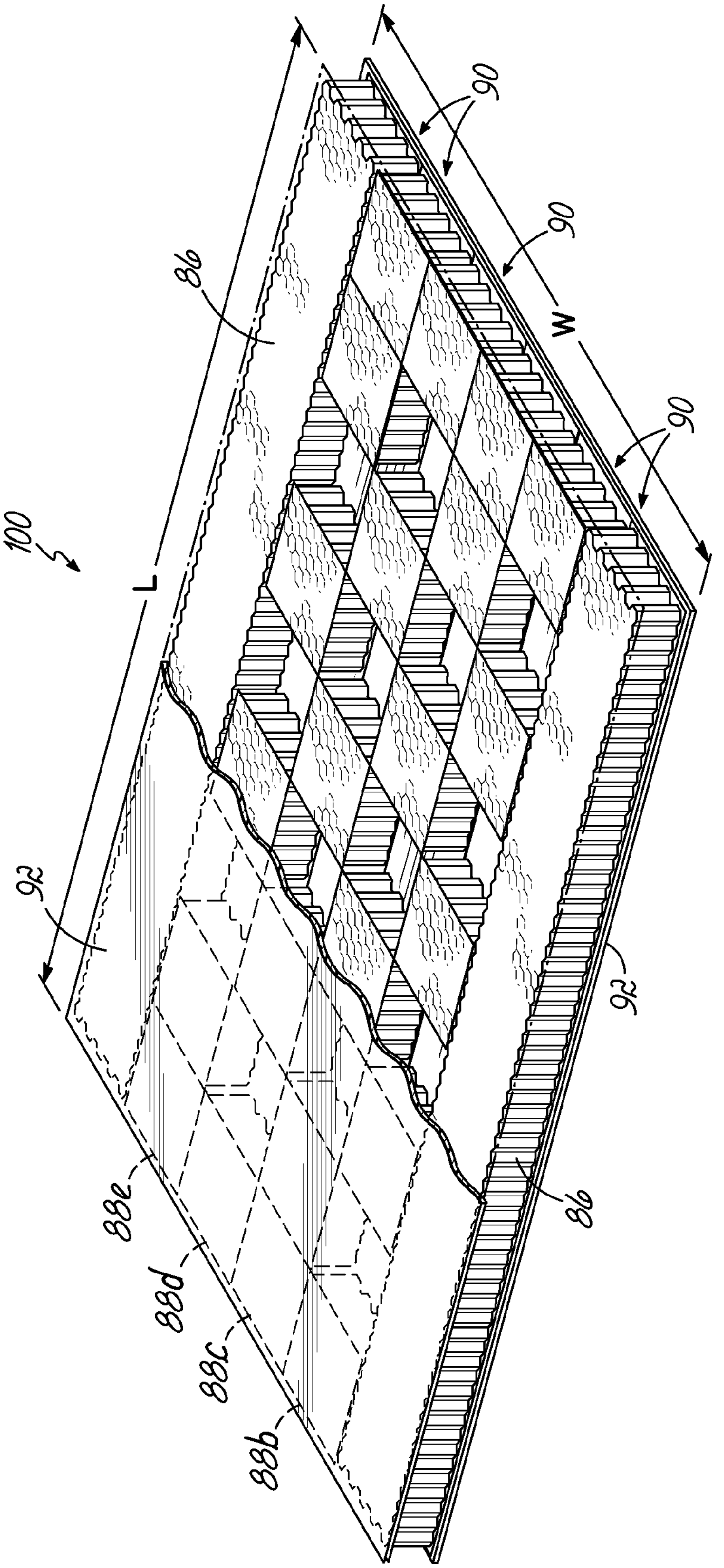
FIG. 11 is a perspective view of a finished product made by the method shown in FIGS. 9 and 10.

FIGS. 9-11 illustrate another method of making another multi-layered product 72 having an interior honeycomb layer. FIG. 9 illustrates an apparatus 74 comprising a plurality of webs of material 76*a-f* wound on rolls 78*a-f* supported by a support 80 in the form of a rod. Although six rolls of material are illustrated, any desired number of rolls and/or webs of material may be used in this process of making a honeycomb product. Similarly, the rolls may be supported by any support(s) and may be located at different locations than those illustrated in FIGS. 6-8. After the webs 76*a-f* are unwound or unrolled, they are passed through a treatment processor 82. Inside the processor 82, each web is treated in a manner as shown in FIGS. 1-5. A controller 84 controls the timing of the treatment of each web inside the processor 82.

Again, the thickness or height of the webs may be different. Alternatively, the webs may all be the same thickness. In other words, any number of webs may be any desired thickness.

As shown in FIG. 9, the outermost webs 76*a* and 76*f* are continuously treated by the processor 82 to create continuous honeycomb core borders or sides 86. The interior webs 76*b-e* are intermittently treated by the processor 82 to create spaced honeycomb core blocks 88*b-e*. The spaced honeycomb core blocks 88*b* are joined together by the web 76*b*. The spaced honeycomb core blocks 88*c* are joined together by the web 76*c*. The honeycomb core blocks 88*d* are joined together by the web 76*d*. The spaced honeycomb core blocks 88*e* are joined together by the web 76*e*.

All of these treated strips 90 move in the direction of the arrows shown in FIGS. 9-11. FIG. 10 shows two outer or protective skins 92 being placed over and under the adjacent strips 90 to create a three-layered continuous product 98. The outer skins 92 are applied from rolls of material 94. A cutter or cutting device 96 cuts the three-layered product 98 to a desired size of product 100 having a longitudinal dimension or length L in the direction of travel of the materials and a transverse dimension or width W perpendicular to the direction of travel of the materials. Alternatively, the three-layered continuous product 98 may be rolled up and later cut to obtain products 100 of desired sizes.

Product 100 has a continuous border of increased firmness relative to the interior of the product 100 due to the honeycomb sides or borders 86 and the aligned outermost blocks 88*b-e* located at the ends of the strips 90. This process enables the product 100 to weigh less than comparable products having a solid honeycomb core without compromising strength or integrity.

While I have described several preferred embodiments of the present invention, persons skilled in the art will appreciate changes and modifications which may be made without departing from the spirit of the invention. For example, although one configuration of a cell is illustrated and described, the cells of the present invention may be other configurations, such as cylindrical in shape. Therefore, I intend to be limited only by the scope of the following claims and equivalents thereof.

I claim:

1. A process of making a multi-layered product comprising, in any desired order:

moving a generally planar web of material in a first direction;

treating spaced sections of the generally planar web of material to create in each treated section a generally corrugated profile with flattened peaks and flattened valleys joined by connecting portions of the web, said flattened peaks and flattened valleys extending in the first direction;

folding the treated sections to create a honeycomb core sections;

temporarily stopping the treatment while allowing the generally planar web of material to continue its movement in the first direction between treatments; and applying outer skins to multiple spaced honeycomb core sections so the multi-layered product has gaps between adjacent honeycomb core sections, said gaps comprising untreated sections of the web.

2. The process of claim 1 wherein the treating step comprises using a movable tool.

3. The process of claim 2 wherein the movable tool is heated.

4. The process of claim 1 wherein the flattened peaks are co-planar in a plane above the generally planar web of material.

5. The process of claim 4 wherein the flattened valleys are co-planar with the generally planar web of material.

6. The process of claim 1 further comprising cutting the generally planar web of material and the outer skins.

7. The process of claim 1 wherein the generally planar web of material is unrolled from a roll of material before being treated.

8. A process of making a multi-layered product comprising, in any desired order:

making an interior layer having spaced honeycomb core sections by continuously moving a generally flat web of material;

plastically deforming a first portion of the generally flat web of material to create a generally corrugated profile with flattened peaks and flattened valleys joined by connecting portions of the web, said flattened peaks and flattened valleys extending in the direction of travel of the web;

folding the first plastically deformed portion of the web of material to create a first honeycomb core section;

continuing to move the generally flat web of material;

plastically deforming a second portion of the generally flat web of material to create a generally corrugated profile with flattened peaks and flattened valleys joined by connecting portions of the web, said flattened peaks and flattened valleys extending in the direction of travel of the web;

folding the second plastically deformed portion of the web of material to create a second honeycomb core section spaced from the first honeycomb core section with a gap therebetween, the gap comprising an untreated portion of the web;

applying outer skins to the interior layer; and cutting the interior layer and outer skins.

9. The process of claim 8 wherein the generally flat web is unrolled from a roll.

10. The process of claim 8 wherein a tool is used to plastically deform the generally flat web of material.

11. The process of claim 10 wherein the tool is movable.

12. The process of claim 10 wherein the tool is heated.

13. A process of making a multi-layer product comprising, in any desired order:

making an interior layer having honeycomb core sections spaced by gaps therebetween by moving a generally flat web material in a first direction, said gaps comprising generally planar, untreated portions of the web;

treating by plastically deforming portions of the generally flat web using a tool to create a generally corrugated profile with flattened peaks and flattened valleys joined by connecting portions of the web, said flattened peaks and flattened valleys extending in the direction of travel of the web;

folding the plastically deformed portions of the web of material to create multiple, spaced honeycomb core sections joined by the generally flat web; and securing skins to the spaced honeycomb core sections of the the interior layer.

14. The process of claim 13 wherein the tool is heated.

15. The process of claim 13 wherein the tool is movable.

16. The process of claim 13 wherein the generally flat web is unrolled from a roll.

17. The process of claim 13 further comprising cutting the interior layer and the outer skins.

18. A process of making a multi-layer product comprising, in any desired order:

continuously moving a generally planar web of material in a first direction;

creating an interior layer of the multi-layered product by treating sections of said web of material with a tool and folding the treated sections to create a plurality of honeycomb core sections and creating a plurality of untreated sections between said honeycomb core sections by stopping the tool while the web of material continues to move, thus creating multiple spaced honeycomb core sections;

applying outer skins to the multiple spaced honeycomb core sections.

19. The method of claim 18 wherein said tool is heated.

20. The method of claim 18 wherein said tool is movable.

21. The method of claim 18 further comprising cutting the multi-layered material to a desired length.

22. A method of making a multi-layered product comprising, in any desired order:

continuously moving a generally planar web of material in a first direction;

creating an interior layer of the multi-layered product by intermittently treating sections of said web of material with a movable tool to create treated sections and folding each of the treated sections to create a plurality of honeycomb core sections and wherein multiple spaced honeycomb core sections are formed by intermittently creating a plurality of gaps between said honeycomb core sections by stopping the tool while the web of material continues to move, the gaps comprising generally planar portions of the web;

applying outer skins to the multiple spaced honeycomb core sections.

23. The method of claim 22 wherein said tool is heated.

24. The method of claim 23 wherein said tool is movable.

25. The method of claim 22 further comprising cutting the multi-layered material to a desired length.

* * * * *

UNITED STATES PATENT AND TRADEMARK OFFICE

CERTIFICATE OF CORRECTION

PATENT NO. : 8,308,885 B2
APPLICATION NO. : 12/908184
DATED : November 13, 2012
INVENTOR(S) : Judson A. Bradford It is certified that error appears in the above-identified patent and that said Letters Patent is hereby corrected as shown below:

Column 7

Line 1, delete the word “a”.

Column 8

Line 1, “web material” should be --web of material--.

Line 13, “the the interior layer” should be --the interior layer--.

Signed and Sealed this
Fifth Day of February, 2013

Teresa Stanek Rea
*Acting Director of the United States Patent and Trademark Office*